United States Patent [19]

Schrag et al.

[11] Patent Number: 4,742,880
[45] Date of Patent: May 10, 1988

[54] METHOD AND APPARATUS FOR DETERMINING THE WEIGHT OF BALES ISSUING FROM A CROP BALER

[75] Inventors: Thomas G. Schrag, Hesston, Kans.; Charles F. Hood; Scott A. Morton, both of Ranchester, Wyo.

[73] Assignee: Hesston Corporation, Hesston, Kans.

[21] Appl. No.: 38,610

[22] Filed: Apr. 15, 1987

[51] Int. Cl.$^4$ .................... G01G 19/08; G01G 19/40
[52] U.S. Cl. ........................................ 177/136; 177/1; 177/25; 100/99
[58] Field of Search ................ 177/1, 25.14, 136, 145; 100/99

[56] References Cited

U.S. PATENT DOCUMENTS

| | | | |
|---|---|---|---|
| 3,363,707 | 1/1968 | Murray et al. | 177/136 |
| 3,567,072 | 3/1971 | Tenhulzen | 177/145 X |
| 4,224,867 | 9/1980 | Gaeddert et al. | 100/99 X |
| 4,246,743 | 1/1981 | Anstee et al. | 100/99 X |
| 4,362,097 | 12/1982 | Rogers | 177/136 X |

Primary Examiner—George H. Miller, Jr.
Attorney, Agent, or Firm—Hovey, Williams, Timmons & Collins

[57] ABSTRACT

Bales emanating from the discharge end of a baler are received on an accumulating trailer provided with a weighing scale that, in combination with an electrical system, automatically determines the weight of certain of the successively issuing bales and conveniently displays such weight to the operator in the cab of the towing vehicle so that the operator can monitor the quality and condition of bales prepared by the machine on an ongoing, non-stop basis. An onboard computer preferably forming a part of the electronic system controls the process and assures its accuracy, while also providing information such as the average weight of bales weighed since last resetting the system.

10 Claims, 7 Drawing Sheets

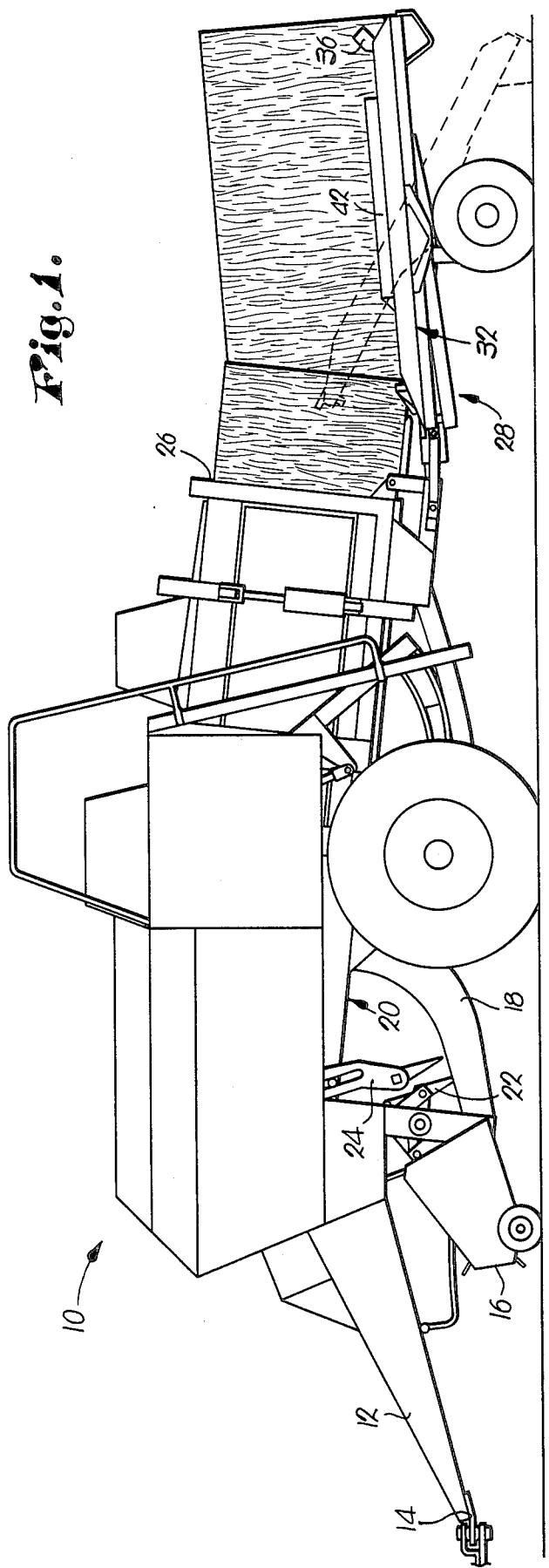
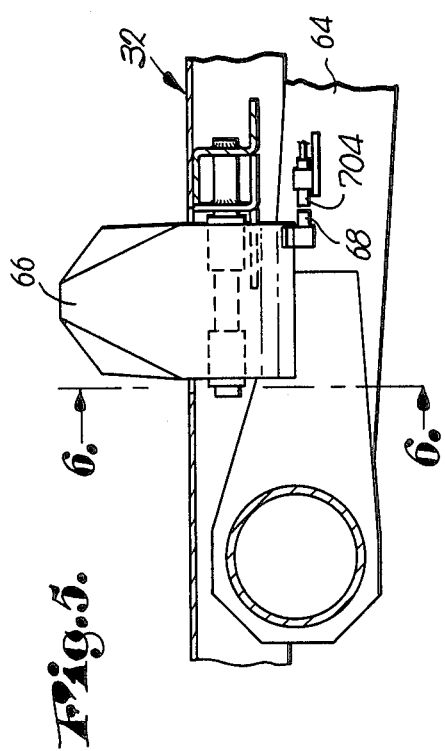
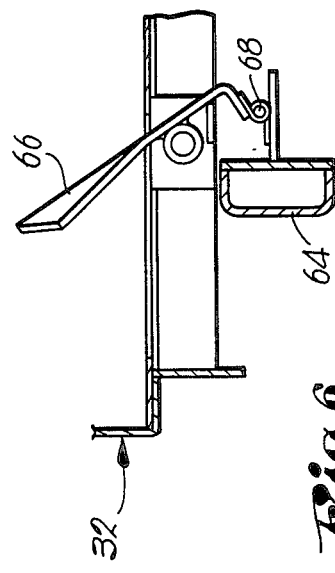

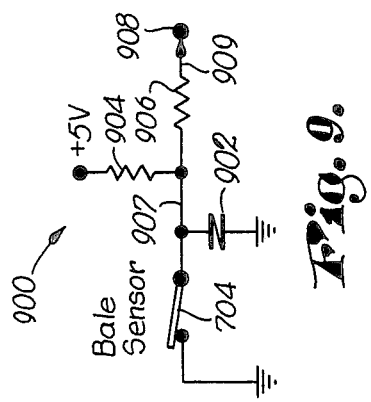
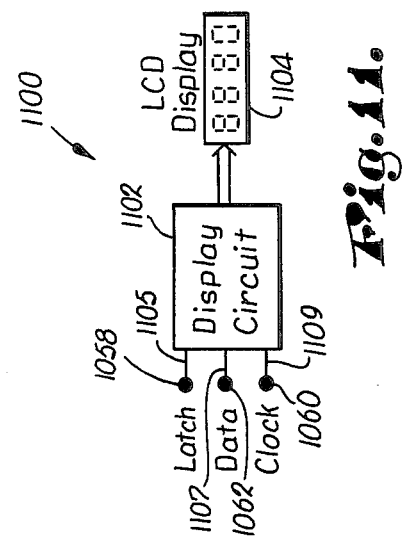
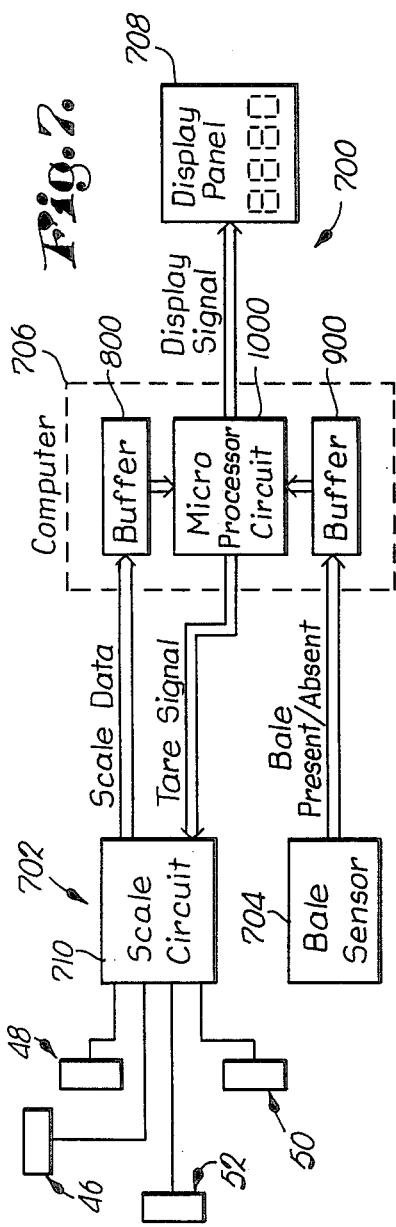
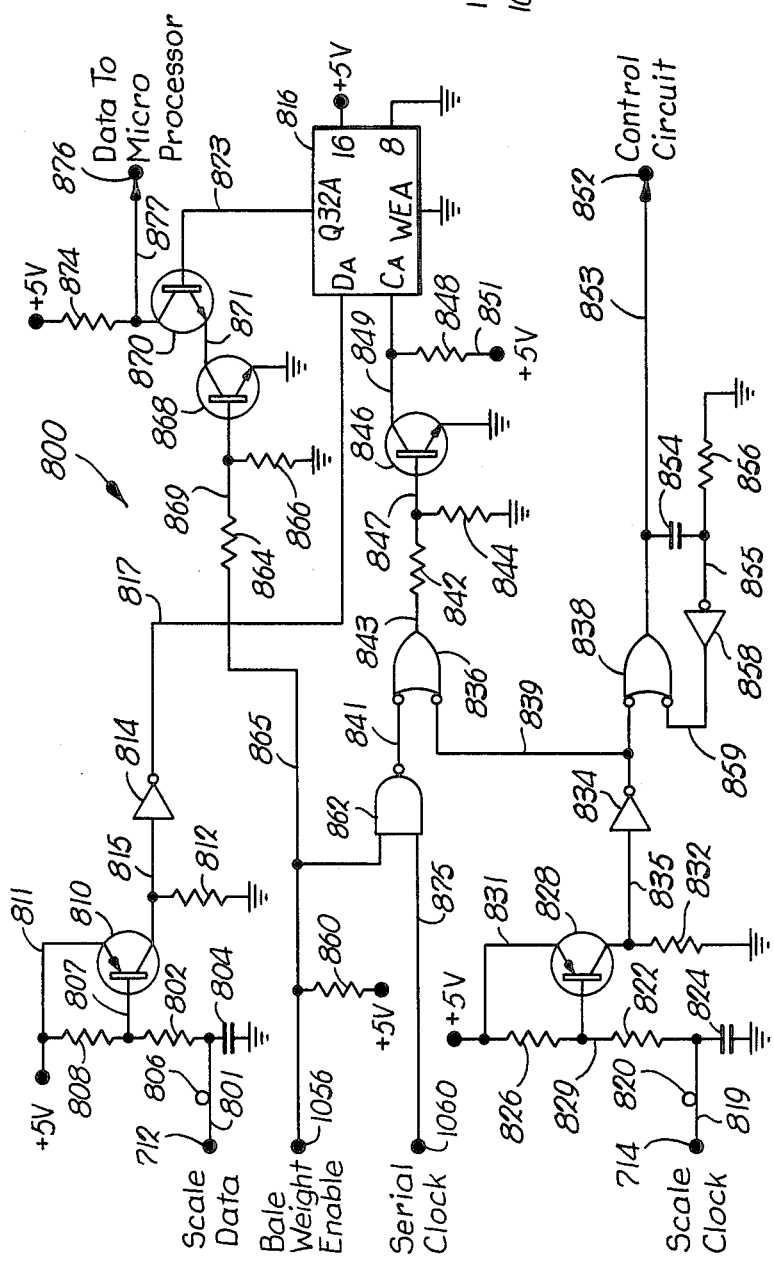

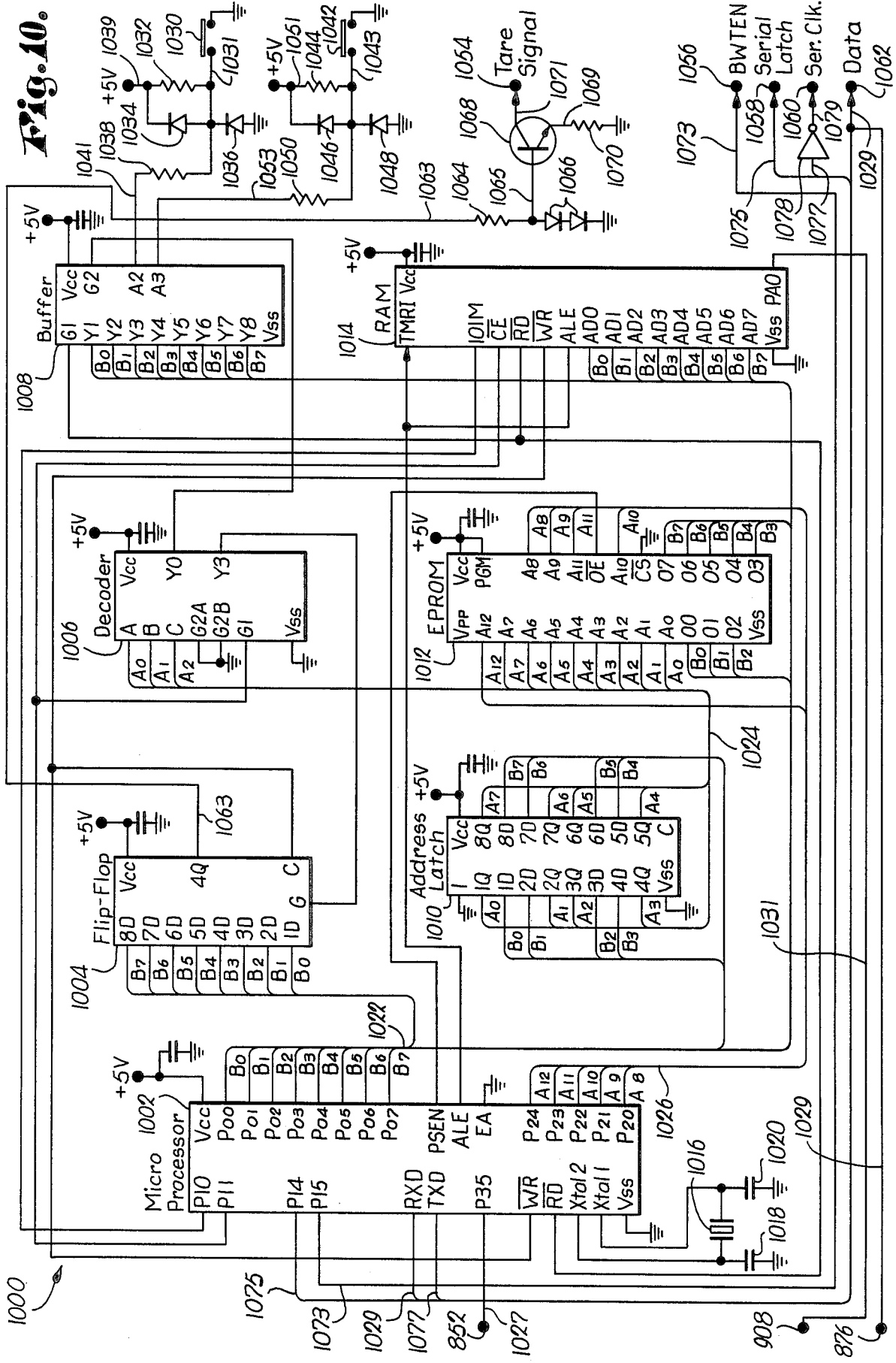

METHOD AND APPARATUS FOR DETERMINING THE WEIGHT OF BALES ISSUING FROM A CROP BALER

TECHNICAL FIELD

The present invention relates to crop balers and, more particularly, to a method and means for automatically and accurately determining the weight of bales being produced by the baler so that the operator may have an essentially continuous, ongoing indication of the nature and quality of the crop packages.

BACKGROUND

In the packaging of hay and other crops, it is important that the operator have at his disposal means for accurately checking the nature and quality of the hay packages being produced by the baler. For example, it is particularly important that hay not be packaged into dense, compacted bales at a time when the moisture content of the hay is excessively high, or else the excessive moisture will give rise to a chemical reaction internally of the hay packages which will result in the generation of heat and the ultimate consumption of the bale by fire, Yet, when the baling delicate crops like alfalfa wherein much of the nutrients are contained in the brittle leaves of the plant, it is the common practice to bale during evening and night time hours when the presence of dew on the plants helps prevent leaf loss caused by handling of the plants by the various moving components and mechanisms of the baler. Furthermore, and particularly where the farmer is relying upon the hay as a cash crop which is shipped in bales to various markets around the country, it is desirable for the farmer to monitor the payload represented by the bales produced in his machine so that he can take whatever steps may be appropriate in the harvesting procedure to optimize the nature and quality of the bales.

While the concept of weighing bales as they issue from a crop baler is not broadly new, it is believed that the art has heretofore lacked a way of automatically checking the bale weight and displaying the result to the operator in the cab of the towing tractor while the baler continues to move across the field carrying out its baling function.

SUMMARY OF THE INVENTION

Accordingly, an important object of the present invention is to provide a novel method and apparatus for determining the weight of bales issuing from a crop baler and displaying such determination to the operator of the tractor towing the baler without requiring significant operator involvement. In carrying out the foregoing object, the present invention contemplates the use of an electronic scale located on a trailered cart or accumulator hitched to the baler in position for receiving bales issuing from the latter, which scale is connected to an onboard computer that controls operation of the scale and provides certain calculation and memory functions in connection with operation of a display console which is visually accessible by the operator.

BRIEF DESCRIPTION OF THE DRAWINGS

FIG. 1 is a side elevational view of a baler and trailered accumulating cart of the type especially suitable for use in connection with the principles of the present invention;

FIG. 5 is an enlarged, fragmentary, transverse cross-sectional view through the left platform of the cart illustrating certain details of construction associated with a sensor that determines the presence or absence of a bale on such platform;

FIG. 6 is a transverse cross-sectional view of the left platform taken substantially along line 6—6 of FIG. 5;

FIG. 7 is a schematic representation of the electrical system of the bale weighing apparatus;

FIG. 8 is an electrical schematic of the scale data input buffer circuit;

FIG. 9 is an electrical schematic of the bale sensor input buffer circuit;

FIG. 10 is an electrical schematic of the microprocessor circuit;

FIG. 11 is a schematic representation of the display panel circuit;

DETAILED DESCRIPTION

Mechanical Aspects

Figure 2:
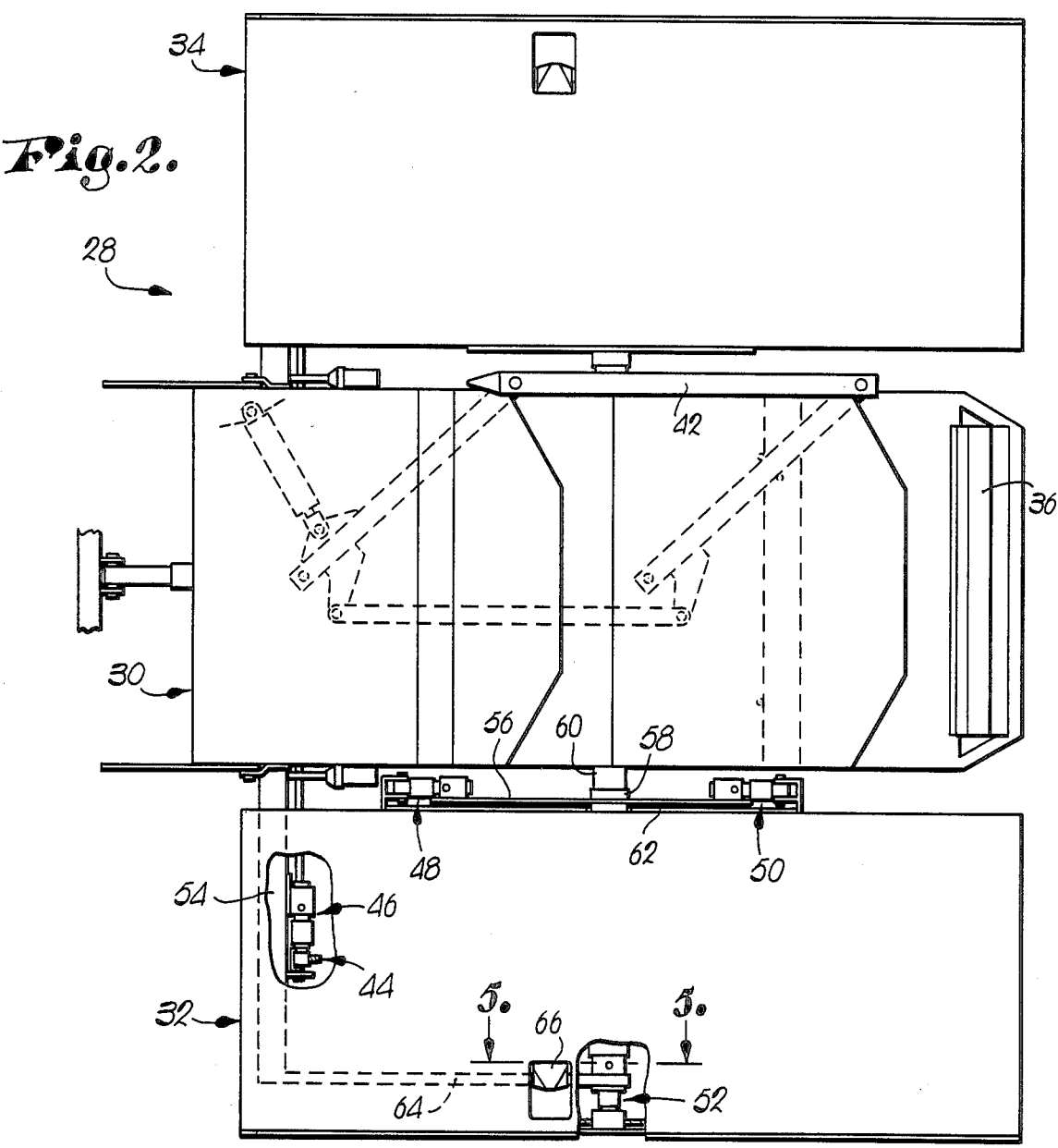
FIG. 2 is an enlarged, top plan view of the accumulating cart of FIG. 1 showing components of an electronic scale associated with the left outboard platform of the cart as viewed from the rear of the machine.
Figure 3:
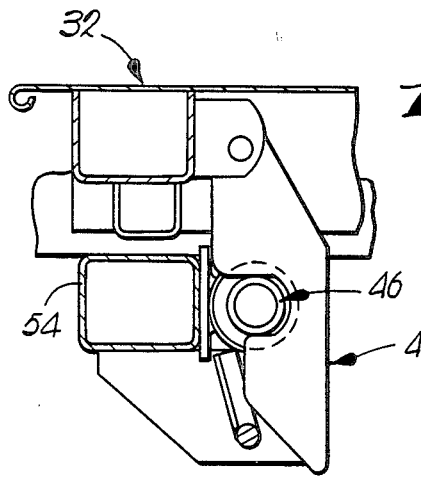
FIG. 3 is an enlarged, fragmentary, transverse cross-sectional view through the latch and associated structure of the left platform of the cart.

The baler 10 has a forwardly extending tongue 12 provided with a hitch 14 by which the baler 10 may be coupled with a towing tractor (not shown). A pickup 16 located adjacent the front of the baler and beneath the tongue 12 lifts windrowed hay off the ground as the baler advances and delivers such picked up hay rearwardly into the front end of a forming duct 18 that curves upwardly and rearwardly to an overhead, generally horizontally extending baling chamber denoted broadly by the numeral 20. Hay is packed in the duct 18 by a continuously operating packer mechanism 22 so that a compacted charge is formed corresponding to the internal shape of the duct 18, whereupon the prepared charge is inserted up into the overhead chamber 20 by a cyclicly operating stuffer 24. A plunger (not shown) reciprocates continuously in a foreand-aft direction within the chamber 20 to engage and press rearwardly each new charge introduced into the chamber 20 by the stuffer 24. Further details of the nature and operation of the baler 10 with respect primarily to the charge forming and loading aspects thereof may be found in U.S. Pat. No. 4,106,267.

The baling chamber 20 has a rearmost discharge end 26 whose outlet opening (not shown) is restricted with respect to upstream portions of the chamber 20 so as to provide back pressure for the compacting plunger as bales are progressively formed in the baler and are "extruded" from the discharge end 26. An accumulating cart 28 hitched to the rear of baler 10 receives the issuing bales and is capable of accumulating three of such bales before they must be dumped to the ground to make room for the next threesome of bales.

Figure 4:
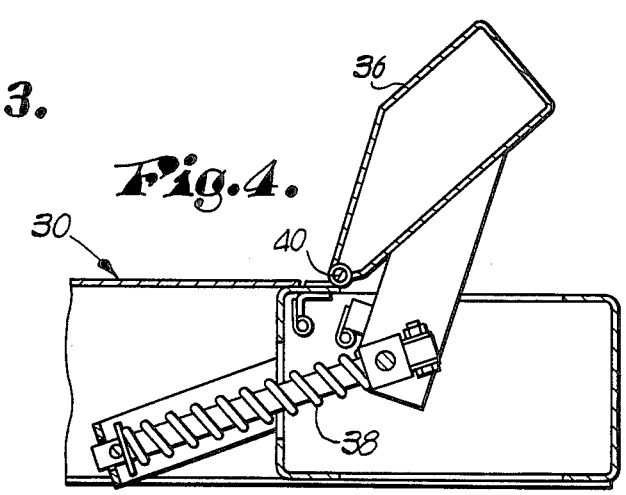
FIG. 4 is an enlarged, fragmentary, transverse cross-sectional view of the rear actuating treadle associated with the center platform of the accumulating cart.

As illustrated in FIG. 2, the accumulating cart 28 includes a center platform 30 and a pair of left and right platforms 32 and 34 respectively on opposite sides of platform 30. The center platform 30 has an actuating treadle 36 at its rearmost extremity which is spring biased into an upwardly projecting, standby position as illustrated in FIG. 4 by a spring assembly 38 located below the top surface of the platform 30. Upon engagement by a bale received fully upon the center platform 30 and moved completely to the rear thereof, the treadle 36 swings downwardly about a transverse pivot 40 (FIG. 4) to enable actuation of a transfer bar 42 (FIG. 2) parked in a standby position along the right side of platform 30. Bar 42 sweeps the bale leftwardly onto the left platform 32 and then parks along the left side of center platform 30 until the next bale has issued from the baler and depressed treadle 36, whereupon transfer bar 42 sweeps to the right across platform 30 and loads the bale onto the right platform 34.

After a third bale has issued onto the center platform 30, all three bales may be dumped to the ground after stopping advancement of the baler 10. In this regard, it will be noted that left and right platforms 32, 34 are each tiltable downwardly and rearwardly to dumping positions as illustrated by the phantom lines in FIG. 1, allowing the bales resting thereon to slide rearwardly to the ground. Preferably, each of the side platforms 32, 34 is mounted on the frame of the cart 28 in such a manner that, although platforms 32, 34 are normally held in horizontal positions by releaseable latches 44 (FIG. 2), when latches 44 are released, the center of gravity of each platform-plus-bale combination is located to the rear of the tilt axis of the platforms 32, 34 so that the platforms 32, 34 automatically swing to their dump positions. Once free of the dumped bales, however, the center of gravity of each empty platform 32, 34 is located to the front of the tilt axis so that platforms 32, 34 automatically return to their normal horizontal positions and the latches 44 automatically relatch.

After the bales on platforms 32, 34 have been dumped, bar 42 may again be actuated to shift the center bale onto the left platform 32, whereupon release of the latch 44 associated with that platform will cause the third bale to be dumped. Releveling of left platform 32 and relatching of its latch 44 then prepares the cart 28 for renewed operation of the baler 10.

In the preferred embodiment only the left platform 32 is provided with a scale for weighing bales presented thereto, although it is certainly within the scope of the present invention to also provide a scale in association with platform 34, or a single scale in connection with center platform 30. Thus, focusing attention upon the left platform 32 in FIG. 2, it will be seen that a series of four separate load sensors 46, 48, 50 and 52 are provided as part of a weighing scale associated with the platform 32. The sensors 46-52 are in the nature of weigh bars commercially available from Butler Manufacturing Company of Atkinson, Wis., and include components which undergo deflection in proportion to the amount of loading placed thereon, which loading can be detected and utilized electronically to provide a measure of the bale weight.

The front weigh bar 46 is attached to a proximal frame member 54 in the vicinity of the latch 44 and receives loading from the platform 32 when the latter is latched down in its horizontal position. Weigh bars 48 and 50 are carried by a fore-and-aft extending beam 56 at opposite ends of the latter, which beam 56 is in turn affixed to a sleeve 58 on the axle 60 which forms the tilt axis of platform 32. The distal ends of weigh bars 48 and 50 are secured to adjacent portions of the platform 32 by a fore-and-aft extending connector plate 62 that is secured only the platform 32 itself and the weigh bars 48, 50 while remaining out of contact with the sleeve 58 and axle 60 so that loading from inboard regions of the platform 32 is directed exclusively to the weigh bars 48, 50.

The fourth weigh bar 52 is carried by the axle 60 adjacent the outboard end of the latter, which is in turn supported by a fore-and-aft frame member 64. The weigh bar 52 projects outwardly beyond the end of the axle 60 and attaches at its outermost end to the platform 32. Bearings associated with the weigh bar 52 facilitate rocking movement of the platform 32 about the axle 60 between the load supporting and dumping positions above-described.

Electrical Circuits and Operation

FIG. 7 presents a schematic representation of the electrical system 700 of the preferred bale weighing system. In general, the preferred system 700 includes electronic scale 702 associated with platform 32, bale sensor 704, computer 706, and display panel 708.

Electronic scale 702 includes weigh bars or load sensors 46, 48, 50, and 52, and scale circuit 710. During operation, load sensors 46-52 continuously transmit analog signals indicative of the weight present thereon to scale circuit 710. Circuit 710 then converts the signals to digital form, integrates the individual weights from each load sensor to calculate a total gross weight, subtracts a tare weight value stored in memory, and transmits scale data in digital form indicative of the total net bale weight present on the scale to computer 706.

Bale sensor 704, to be further described hereinbelow, indicates to computer 706 whether a bale is present on or absent from scale 702.

Computer 706 includes scale data input buffer circuit 800, bale sensor input buffer 900 circuit, and microprocessor circuit 1000.

Computer 702 determines and verifies whether a bale is preent on scale 702 by processing the signal received from bale sensor 704. When the presence of a bale on scale 702 has been verified, computer 706 reads the scale data from scale circuit 710, processes the scale data, and transmits a display signal to display panel 708 in order to display the weight of the bale present on scale 702.

Additionally, computer 706 keeps a running total of the total weight and count of the bales weighed and calculates an updated average, weight-per-bale. The average weight and total bale count of the bales weighed can also be displayed on panel 708.

After a bale has been dumped from scale 702, computer 706 verifies that a bale is absent and then sends a tare signal to scale circuit 710. Upon receipt of the tare signal, scale circuit 710 reads the signals from load sensors 46-52 to develop a tare weight which is used as the tare weight for all future scale data until a new tare signal is received. Ordinarily, computer 706 tares or zeros circuit 710 once for each time scale 702 goes empty.

Turning now to the details of electrical system 700, the preferred values of the various resistors and capacitors are indicated on the drawing figures or indicated in parentheses on the text hereinafter when the component is first mentioned. Additionally, the electrical system 700 includes a conventional power supply capable of delivering a stable voltage at ±5 v.d.c. Desirably, the power supply in turn receives its power supply from the 12 volt system of the tractor towing baler 10. This is preferred inasmuch as computer 706 and display panel 708 are preferably mounted within the tractor cab for convenient viewing by the operator.

Electronic scale 702 is preferably a conventional unit available from Butler Manufacturing Company of Fort Atkinson, Wis. The Butler scale circuit 710 transmits data and a clock signal over respective lines (not shown) to terminals 712 and 714 of scale data input buffer circuit 800 (FIG. 8). The data is in the form of 8 bit bytes with each bit being 10 microseconds wide and 10 microseconds between bytes. The data is transmitted in blocks of 13 bytes every 300 milliseconds. The format of the data is a matter of design choice and in the preferred embodiment of the present invention, only the last 4 bytes of the 13 byte block are needed and used and are in the form of binary encoded decimal corresponding to the four decimal digits representing the weight of the bale (e.g., 1563 pounds). The clock signal is in synchrony with the serial data.

Additionally, scale circuit 710 is designed to receive an external tare signal which, in the present invention, is transmitted from the microprocessor circuit 1000 (FIG. 10) which will be discussed further hereinbelow. Scale circuit 710, upon receiving the tare signal, places a tare value in memory which represents the weight sum of the signals from load sensors 46-52 existing at the time of receipt of the tare signal. The scale data transmitted from scale circuit 710 to computer 706 is the net weight of a bale thereon after subtracting the tare value from the gross weight as indicated by the sum of the weigh bar signals. The old tare value is replaced by new tare value each time a tare signal is received from computer 706.

Turning now to the details of the various circuits, scale data input buffer circuit 800 receives scale data from scale circuit 710 at terminal 712 and scale clock signals from scale circuit 710 at terminal 714. Scale circuit 710 is designed to sink current but relies on external pull-up to ±5 v.d.c.

In the quiescent state, scale clock terminal 712 is high. Circuit 800 also receives bale weight enable and serial clock signals from microprocessor circuit 1000 by way of terminals 1056 and 1060. Terminals 1056 and 1060 are logic low until microprocessor circuit 1000 is ready to receive data.

Scale data from terminal 712 is transmitted via line 801 to one side of resistor 802 (330 ohms) and to one side of and capacitor 804 (1.0 nf.). Bead indicator 806 is coupled to line 801 to provide radio frequency suppression. The other side of capacitor 804 is grounded as shown and the other side of resistor 802 is coupled via line 807 to pull up resistor 808 (220 ohms) and to the base of PNP transistor 810 (2N2907A). Operating voltage at ±5 v.d.c. is suppled to the other side of resistor 808 and to the emitter of transistor 810 by way of line 811. The collector of transistor 810 is connected to one side of resistor 812 (1000 ohms) and to inverter 814 via line 815. The other side of resistor 812 is grounded as shown and the output of inverter 814 is connected to data input terminal DA of shift register 816 via line 817.

The network including resisters 802, 808, and 812, capacitor 804, transistor 810, and inverter 814 supplies pull up voltage for scale circuit 710 when data input is high and buffer the input to provide logic true data at terminal $D_A$ of shift register 816.

An identical circuit is provided for input buffering for the scale clock signals at terminal 714. The scale clock input buffering components include line 819 connecting terminal 714 with bead inductor 820, one side of register 822 (330 ohms), and one side of capacitor 824 (1.0 nf.) The other side of capacitor 824 is grounded as shown and the other side of resistor 822 is connected to one side of resistor 826 (220 ohms) and to the base of PNP transistor 828 (2N2907A) via line 829. Operating voltage at ±5 v.d.c. is supplied via line 831 to the other side of resistor 826 and to the emitter of transistor 828. The collector of transistor 828 is connected to resistor 832 (1000 ohms) and to inverter 834 via line 835, the other side of resistor 832 is grounded as shown.

The output from inverter 834 is logic true and is connected to one input of NAND gate 836 and to one input terminal of NAND gate 838 via line 839.

NAND 836 receives its other input via line 841. The output from NAND 836 is connected to resistor 842 (4.7 K ohms) via line 843. The other side of resistor 842 is connected to one side of resistor 844 (1000 ohms) and to the base of NPN transistor 846 (2N4124) via line 847.

The emitter of transistor 846 is connected to ground as shown and the collector is connected to one side of pull up resistor 848 (1000 ohms) and to clock data input terminal $C_A$ of shift register 816 via line 849. Operating power at ±5 v.d.c. is supplied to the other side of resistor 848 via line 851.

Shift register 816 is a conventional dual 64-bit static shift register such as Motorola Model No. MC14517B. Terminals WEA and No. 8 of register 816 are grounded as shown and operating power at ±5 v.d.c. is supplied to terminal 16. Output from register 816 is provided at terminal Q32A which corresponds to bit 32.

In the operation of circuit 800 to receive and store scale data, the input scale data is received at terminal 712 and is buffered and presented as inverted data to inverter 814 which presents the data as true to terminal $D_A$ of register 816. Scale circuit 710 outputs data in blocks of 13 bytes having 8 bits each. Register 816 can only store 8 bytes and so only the last 8 bytes of the transmitted data are stored in register 816. Only the last 4 bytes correspond to the binary coded decimal weight data required and so the output from register 816 is taken at bit 32.

Scale clock input is received at terminal 714 and is provided by scale circuit 710 in synchrony with the scale data but with a leading offset in time of ½ bit. In this way, the input data to register 816 is clocked through during the low to high transistion of the clock signal. The clock signal received at terminal 714 is buffered and inverted as input to inverter 834 which again inverts the clock signal as logic true to NAND 836. The other input to NAND 836 is logic high (±5 v.d.c.) whenever scale circuit 710 is transmitting data to be explained further hereinbelow. NAND 836 transmits an inverted clock signal to transistor 846 which again inverts the clock signal to present it as true to terminal $C_A$ of register 816.

Each block of scale data presented to register 816 is clocked through which each low to high transition of the scale clock signal which occurs during each data bit because of the ½ bit offset of the clock signal. In this way, the data in register 816 is kept current according to the most recent block of data transmitted by scale circuit 710.

The balance of input buffer circuit 800 is designed to transmit data to the microprocessor when called for and to ensure that the data transmission to the microprocessor does not occur when scale circuit 710 is transmitting data. When microprocessor circuit 100 is ready to receive data from register 816, the operating program first looks to see a low-to-high and then high-to-low transition at control terminal 852. These transitions occur respectively at the beginning and shortly after the ending of the data block transmission from scale circuit 710. This provision ensures that microprocessor circuit 1000 does not call for data input during a transmission from scale circuit 710.

When scale circuit 710 is in a quiescent state, the input to NAND 838 via line 839 is high and the output from NAND 838 to control terminal 852 via line 853 is low. When the high-to-low transition of the first transmitted scale clock signal occurs, NAND 838 output goes high and current flows through capacitor 854 (0.1 uf.), line 855, and resistor 856 (22 K ohms) to ground as shown. When current begins to flow through resistor 856, the input voltage to Schmitt trigger inverter 858 via line 855 also goes high and the output from inverter 858 via line 859 goes low. When line 859 goes low, which is the second input to NAND 838, the output of NAND 838 is latched high and remains high even after the clock signal input on line 839 again goes high. As capacitor 854 charges, the current flow through resistor 856 drops and the voltage presented on line 855 drops also.

The RC time constant of capacitor 854 and resistor 856 is designed so that the voltage on line 855 does not drop to the Schmitt trigger level until after a time sufficient for scale circuit 710 to complete its data transmission. That is to say, the data transmission time from scale circuit 710 takes about 1.7 milliseconds and the RC time constant is designed to reach the Schmitt trigger level after about 2.2 milliseconds. Thus, by the time the voltage on line 855 drops to the Schmitt trigger level and the output from inverter 858 goes high, the input via line 839 to NAND 838 is already high and the output from NAND 838 goes low as does terminal 852. Thus, the leading edge of the first clock pulse causes terminal 852 to go high which then goes low again about 2.2 milliseconds later.

After the high to low transition at terminal 852, microprocessor circuit 1000 transmits a bale weight enable signal as logic high to terminal 1056 when called for by the operating program. Terminal 1056 is connected to pull-up resistor 860 (1000 ohms), NAND 862, and resistor 864 (1000 ohms) via line 865. Pull-up voltage at ±5 v.d.c. is provided to the other side of resistor 860. The other side of resistor 864 is connected to resistor 866 (10 K ohms) and to the base of NPN transistor 868 (2N4124) via line 869. The emitter of transistor 868 is connected to ground as shown and the collector is connected to the emitter of transistor 870 via line 871.

The base of transistor 870 (2N4124) is connected via line 873 to output terminal Q32A of register 816. The collector of transistor 870 is connected to pull up resistor 874 (1000 ohms) and to data output terminal 876 via line 877. Pull-up voltage at ±5 v.d.c. is supplied to the other side of resistor 874.

When terminal 1056 receives the bale weight enable signal, transistor 868 is switched on which enables data transmission from register terminal Q32A through transistor 870 to output terminal 876. Transistors 868, 870 also serve to isolate the output from terminal Q32A from the data bus at terminal 876 until enabled by the signal at terminal 1056.

Input buffer circuit 800 receives serial clock input from microprocessor circuit 1000 at terminal 1060. The serial clock input is transmitted via line 875 to the second input of NAND 862. NAND 862 receives its other enabling input via line 865 from terminal 1056. When thus enabled, NAND 862 transmits the serial clock input inverted to NAND 836. Since the scale clock input is in the quiescent state, the other input via line 839 to NAND 836 is high and the serial clock signal is inverted by NAND 836 and transmitted to transistor 846. Transistor 846 again inverts the serial clock signal which is presented to clock input terminals $C_A$ of register 816.

With each low to high transition of the serial clock signal, the last 32 bits of data stored in register 816 are presented to output data terminal 876 and onto the serial data bus.

Turning now to the second primary information input to computer 706, FIGS. 2, 5, 6, and 9 illustrate bale sensor 704 which is preferably a conventional, magnetically actuated switch. As shown in FIGS. 2, 5, platform 32 includes an upwardly biased, pivotally mounted, arm 66 which is depressed from an extended position to a position flush with the top surface of platform 32 whenever a bale is present thereon. The lower end of arm 66 includes a magnet 68 coupled thereto which magnetically couples with bale sensor 704 mounted to the frame of a accumulator cart 728 when arm 66 is in the extended position and when platform 32 is also in the latched position as shown in FIGS. 2, 5 and 6. Bale sensor 704 is closed as shown in FIG. 9 when magnetically coupled with and actuated by magnet 68. When a bale is present on platform 32 or when platform 32 is in the bale dump position, sensor 704 is open.

Turning now to FIG. 9 which illustrates bale sensor input buffer circuit 900, one side of sensor 704 is connected to ground as shown. The other side of sensor 704 is connected to transient suppression filter 902 (available from the Mu Rata Company as part #DS710-D-2235-12-72), pull-up resistor 904 (1000 ohms), and current limiting resistor 906 (100 Kohms) via line 907. The other side of filter 902 is connected to ground as shown. Pull up voltage at ±5 v.d.c. is supplied to the other side of resistor 904 and the other side of resistor 906 is connected to output terminal 908 via line 909. Circuit 900 is designed so that terminal 908 is logic low when no bale is present on scale 702 and so that terminal 908 is pulled high to ±5 v.d.c. when a bale is present on scale 702.

Microprocessor circuit 1000 (FIG. 10) includes microprocessor 1002 (type 80C31), octal "D" flip-flop 1004 (type 74HCT377), 3-to-8 line decoder 1006 (type 74HCT183), octal buffer and line driver 1008 (type 74HC541), address latch 1010 (type 74HCT373), electrically programmable read-only-memory (EPROM) 1012 (type 27C64), and auxilliary random access memory (RAM) 1014 (type 81C55) with timer and input-/output ports. Components 1000–1014 are conveniently interconnected as shown in FIG. 10.

Microprocessor 1002 includes an external crystal 1016 and capacitors 1018 and 1020 connected as shown to generate a 12 megahertz time base for microprocessor 1002. The operating program for computer 706 as illustrated in FIGS. 12-15 is stored in EPROM 1012.

Data bus 1022 includes lines B0 (least significant bit) B1, B2, B3, B4, B5, B6, and B7 and interconnects microprocessor 1002, flip-flop 1004, buffer and line driver 1008, address latch 1010, EPROM 1012, and RAM 1014 as shown. Low address bus 1024 includes lines A0 (least significant bit), A1, A2, A3, A4, A5, A6, and A7 and interconnects address latch 1010 with EPROM 1012 and a decoder 1006 as shown. Additionally, high address bus 1026 includes lines A8, A9, A10, and A11 (most significant bit) and interconnects microprocessor 1002 with EPROM 1012 as shown. Other lines of circuit are shown individually or bundled as needed for drawing clarity.

Microprocessor 1002 receives the control signal from terminal 852 of bale weight input buffer circuit 800 via line 1027 and bale weight data from terminal 876 via line 1029. RAM 1014 receives the bale sensor signal from terminal 908 of bale sensor input buffer circuit 900 via line 1031.

Microprocessor circuit 1000 also receives two other inputs for receiving average bale weight and bale count display requests at terminals A2 and A3 of buffer and line driver 1008. The average bale weight display request circuit includes conventional normally open membrane switch 1030, one side of which is connected to ground as shown, the other side of which is connected via line 1031 to pull-up resistor 1032 (10 K ohms), the anode of diode 1034, the cathode of diode 1036, and to one side of resistor 1038 (100 K ohms). Pull-up voltage at ±5 v.d.c. is supplied via line 1039 to the other side of resistor 1032 and to the cathode of diode 1034. The anode of diode 1036 is connected to ground as shown. The other side of resistor 1038 is connected via line 1041 to buffer terminal A2. Switch 1030 is normally open and terminal A2 is normally pulled high. When switch 1030 is depressed, for requesting a display of the average bale weight, terminal A2 goes low.

The input circuit for requesting display of bale count is identical to that for requesting an average bale display. The bale count input circuit includes switch 1042, one side of which is connected to ground as shown and the other side of which is connected via line 1043 to resistor 1044 (10 K ohms), to the anode of diode 1046, to the cathode of diode 1048, and to one side of resistor 1050 (100 K ohms). Pull-up voltage at ±5 v.d.c. is supplied via line 1051 to the other side of resistor 1044 and to the cathode of diode 1046. The anode of diode 1048 is connected to ground as shown and the other side of resistor 1050 is connected via line 1053 to buffer terminal A3.

Microprocessor circuit 1000 provides five output signals including a tare signal at terminal 1054 to scale circuit 710, a bale weight enable signal at terminal 1056 to enable data transmission from scale data input buffer circuit 800, and three outputs to display circuit 1100 including a serial latch signal at terminal 1058, a serial clock signal at 1060, and a serial data signal at terminal 1062. The serial clock signal is also delivered to scale data input buffer circuit 800 as discussed above.

To deliver the tare signal to scale circuit 710, the operating program of computer 706 causes terminal 4Q of flip-flop 1004 to go high which is transmitted via line 1063 to one side of resistor 1064 (10 K ohms). The other side of resistor 1064 is connected via line 1065 to the anode of diode 1066 and to the base of NPN transistor 1068 (MJE3440). The cathode of diode 1066 is connected to ground as shown. The emitter of transistor 1068 is connected via line 1069 to resistor 1070 (33 ohms), the other of which is connected to ground as shown. The collector of resistor 1068 is coupled via line 1071 to tare signal output terminal 1054. When terminal 40 goes high, transistor 1068 is switched on and sinks current from terminal 1054 to provide a logic low tare signal to scale circuit 710.

The bale weight enable signal is provided when terminal P15 of microprocessor 1002 goes high via line 1073 to bale weight enable output terminal 1056. The serial latch signal to display panel 708 is provided from the output on terminal P14 of the microprocessor 1002 via line 1075 to terminal 1058. The serial clock signal is provided as an output on terminal TXD of microprocessor 1002 via line 1077 to inverter 1078 which provides an inverted serial clock signal via line 1079 to serial clock output terminal 1060. Serial data output is provided from terminal RXD of microprocessor 1002 via line 1029 to serial data output terminal 1062 which is on the serial data bus and is also common with input terminal 876.

Display panel 708 includes display circuit 1102 and liquid crystal display 1104. The display panel is conventional for a four digit segmented display and receives input from microprocessor circuit 1000 at terminals 1058, 1060, and 1062 as discussed above. Display circuit 1102 (including National Semiconductor type MM5483) receives the input from terminals 1058–1062 via lines 1105, 1107, and 1109 respectively. Upon receipt of the serial latch, data and clock signals, display circuit 1102 activates LCD display 1104 to display the bale weight, average bale weight, or total bale count.

Figure 12:
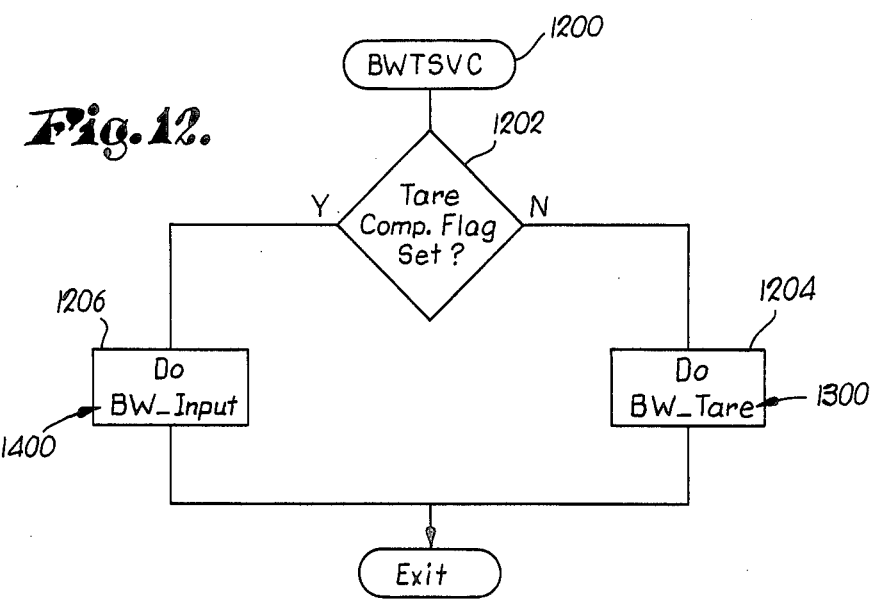
FIG. 12 is a flowchart of the computer program bale weight service module.

The programmed operation of electrical system 700 is illustrated in the program flowcharts of FIGS. 12-15. FIG. 12 illustrates the bale weight service (BWTSVC) module which those skilled in the art will appreciate can be incorporated as part of a larger operating program for controlling and monitoring other aspects of the crop baler apparatus and control which are not the subject of the present invention. The bale weight service module operates in either the bale weight input (BW_INPUT) submodule or the bale weight tare (BW_TARE) submodule. In general, the bale weight input submodule verifies the presence of a bale on scale 702 and receives the bale weight data once for each verified bale presence. In general, the bale weight tare submodule verifies the absence a bale and initiates taring of circuit 710 once for each verified bale absence. The bale weight tare submodule sets a tare complete flag when bale weight taring submodule is complete.

Module BWTSVC is entered at step 1202 which asks whether the tare complete flag is set. If no, the program enters step 1204 which is the bale weight tare submodule, after completion of which the program exits the bale weight service module. If the tare complete flag is set in step 1202, the program enters step 1206 which is the bale weight input submodule upon completion of which the program exits bale weight service module 1200.

Figure 13:
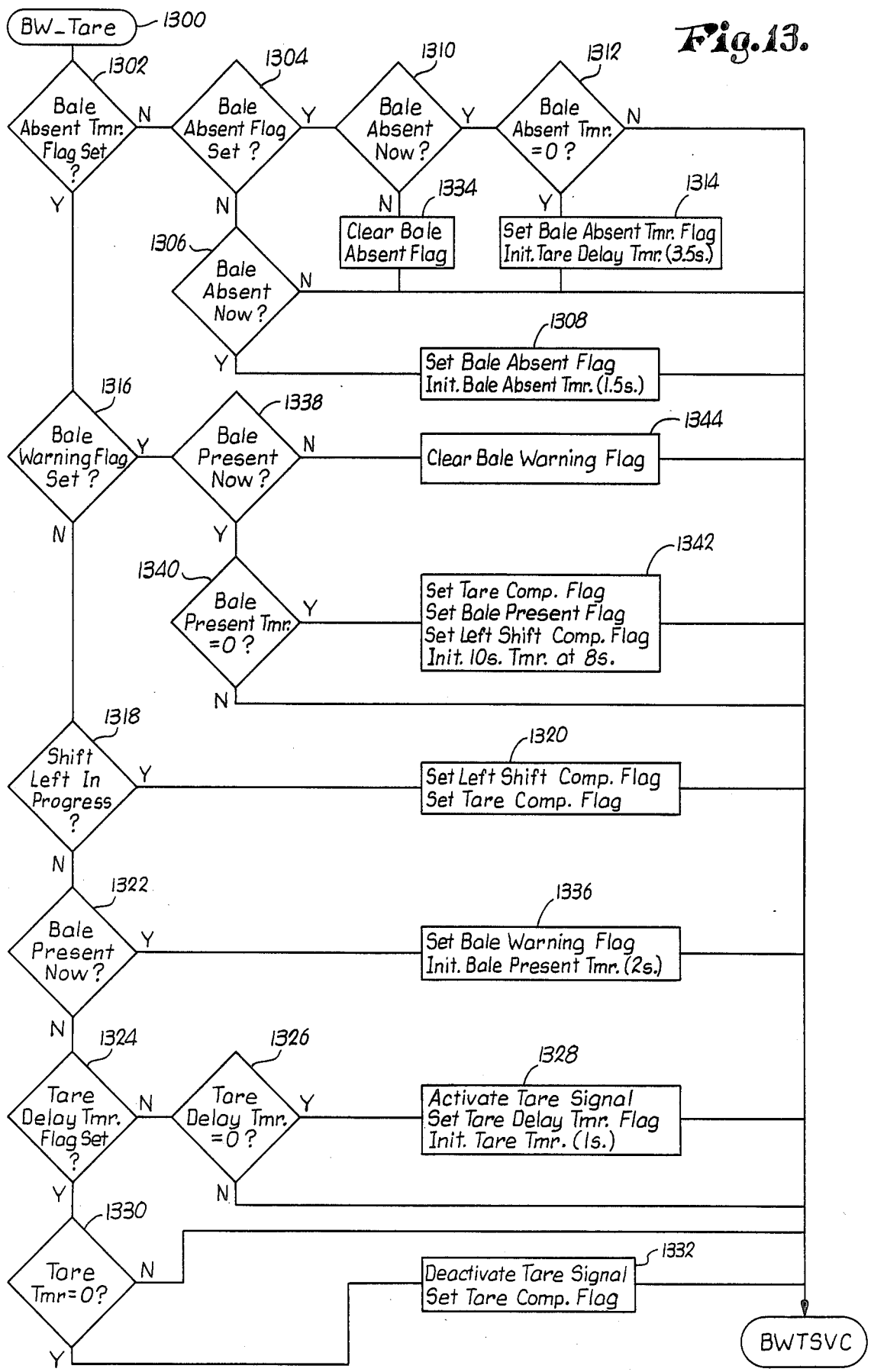
FIG. 13 is a flow chart of the computer program bale weight tare module.

FIG. 13 illustrates bale weight tare submodule, which the program enters at step 1302, which asks whether the bale absent timer flag is set as explained further hereinbelow. Assuming that scale 702 has just gone empty, that is, that a bale has just been dumped from the scale and returned to its horizontal quiescent position, the base absent timer flag is not set and the program moves to step 1304 which asks whether bale absent flag is set. During this first pass through submodule 1300, this flag is not yet set and the program moves to step 1306 which asks whether a bale is absent now as indicated by the input from bale sensor 704. If a bale is absent, sensor 704 is closed, terminal 908 is low, and terminal PAO on RAM 1014 is also low.

If a bale is absent and the program moves on to step 1308 which sets the bale absent flag for step 1304 and initiates the bale absent timer for step 1302 with a count for 1.5 seconds. The program then returns to module 1200 and exits. During the next pass of the program through module 1200, the tare complete flag is not yet set and the program again reenters submodule 1300. In step 1302, the bale absent timer flag is not yet set because the timer has not decremented to zero and the program moves on to step 1304. At this time, however, the bale absent flag is set from the previous pass through step 1308 and the program moves on to step 1310, which asks again whether the bale is absent now.

Normally the bale will still be absent and program will move on to step 1312 which asks whether the bale absent timer has decremented to zero. At this stage in the program, 1.5 seconds have not elapsed, the baler absent timer has not decremented to zero, and the program exits submodule 1300 and module 1200 to reenter submodule 1300 again on the next pass. This continues until the bale absent timer has decremented to zero in step 1312.

The purpose of the 1.5 second delay is to verify that a bale is in fact absent from the scale and that the closing of the bale sensor 702 was not a spurious event.

After the bale absent timer decrements to zero and the absence of a bale thus verified, the program, after step 1312, enters step 1314 which sets the bale absent timer flag and initiates the tare delay timer at a count for 3.5 seconds. The purpose of the tare delay timer is to add an additional delay before taring scale circuit 710 so the total delay is 5 seconds made up of 1.5 seconds from the bale absent timer and 3.5 seconds from the tare timer. This wait of a total of 5 seconds provides additional assurance that a bale is absent from scale 702. After step 1314 the program exits submodule 1300 and reenters on the next pass at step 1302. This time, however, the bale absent timer flag is set and the program moves to step 1316 which asks whether the bale warning flag was set. Normally this flag will not be set unless the presence of a bale on the scale is detected as explained hereinbelow.

Assuming the bale warning flag is not set, the program moves on to step 1318 which asks whether a shift left is in progress, in other words, whether the positioning cylinder on accumulator cart 28 is in the progress of shifting a bale from the center cart leftwardly on to the scale. This activity can be monitored as a matter of design choice by either detecting the presence of voltage on the solenoid coil (not shown) which energizes the hydraulic cylinder of the positioner or by monitoring a software signal if the main program is designed to control the solenoid. Either is advantageous depending upon the particular needs of the designer.

If a bale shift to the left is in progress, this indicates that there is not sufficient time to complete the taring of scale circuit 710 before the new bale appears on scale 702. Thus, if a shift left is in progress, the program moves to step 1320 which sets the left shift complete flag and sets the tare complete flag. By setting the tare complete flag, the program on the next pass will enter the bale weight input submodule 1400 rather than the bale weight tare submodule 1300 and thereby use the old tare value stored in memory in scale circuit 710.

If a shift left is not in progress, the program moves from 1318 to step 1322, which asks again whether a bale is present on the scale as indicated by a bale weight sensor 702. This provides additional assurance that no spurious event has occured to give a false indication that a bale is absent from the scale. In other words, this aids in verifying the absence of a bale from scale 702.

Assuming no bale is present, the program moves from step 1322 to step 1324 which asks whether the tare delay timer flag is set. Until the tare delay timer decrements to zero which was initiated in step 1314, this flag will not be set and the program will move from step 1324 to step 1326 which asks whether the tare delay timer has decremented to zero. Assuming the 3.5 second delay has not yet elapsed, the program exits and keeps cycling through until the tare delay timer has decremented to zero.

When this occurs, the program moves to step 1328 which activates the tare signal at terminal 1054 of microprocessor circuit 1000. Additionally, step 1328 sets the tare delay timer flag and initiates the tare timer for one second in order to provide a continuous tare signal (logic low) to scale circuit 710 for one second.

The program then exits and on the next pass at step 1324 sees that the tare delay timer flag is set and moves to step 1330 which asks whether the tare delay timer has decremented its count to zero. Until one second has elapsed, the answer is no, and the program exits submodule 1300 and continues to loop through until the tare timer has decremented to zero in step 1330. When this has occured, the program moves to step 1332 and deactivates the tare signal, that is, terminal 4Q of flip-flop 1004 goes low, and sets the tare complete flag for step 1202.

Bale weight tare submodule 1300 also makes provisions for various events and abnormalities as part of its operating procedure. If for example, when the program reaches step 1310, and detects a bale as present on the scale, the program will move to step 1334 and clear the bale absent flag. The program then continues to loop through steps 1302, 1304, and 1306 and exit until the bale is seen absent and the bale absent timer decrements to zero and sets the flag in step 1314.

If after the recognizing the bale as absent at 1302, a bale reappears and is detected at 1322, the program moves from step 1322 to step 1336 to set the bale warning flag and to initiate the bale present timer at a count for two seconds. During the next pass, at step 1316, the program sees that the bale warning flag is set and moves to step 1338 which asks whether a bale is present now. If a bale is still present as indicated by bale sensor 702, the program moves on to step 1340 which asks whether the bale present timer, which was initiated in step 1336, has decremented to zero. The program will continue to loop through step 1340 and exit until the bale present timer has decremented to zero. This provides additional verification for two seconds that a bale is present. The program then moves from step 1340 to step 1342 to set the tare complete flag, the bale present flag, and the left shift complete flag, and to initiate the 10 second bale weight input timer at 8 seconds rather than 10 seconds. In other words, if the presence of a bale is detected for two seconds, then the taring process is abandoned under the assumption that a new bale is indeed present.

If, while the bale present timer is decrementing to zero, and the bale apparently disappears, as determined in step 1338, the program moves on to step 1344 to clear the bale warning flag. That is to say, of a bale presence is indicated and then disappears during the two second delay of the bale present timer, it is assumed that the indication of bale presence was a spurious event and the taring routine resumes during the next pass when the program reaches step 1316 which indicates that the bale warning flag is not set.

Figure 14:
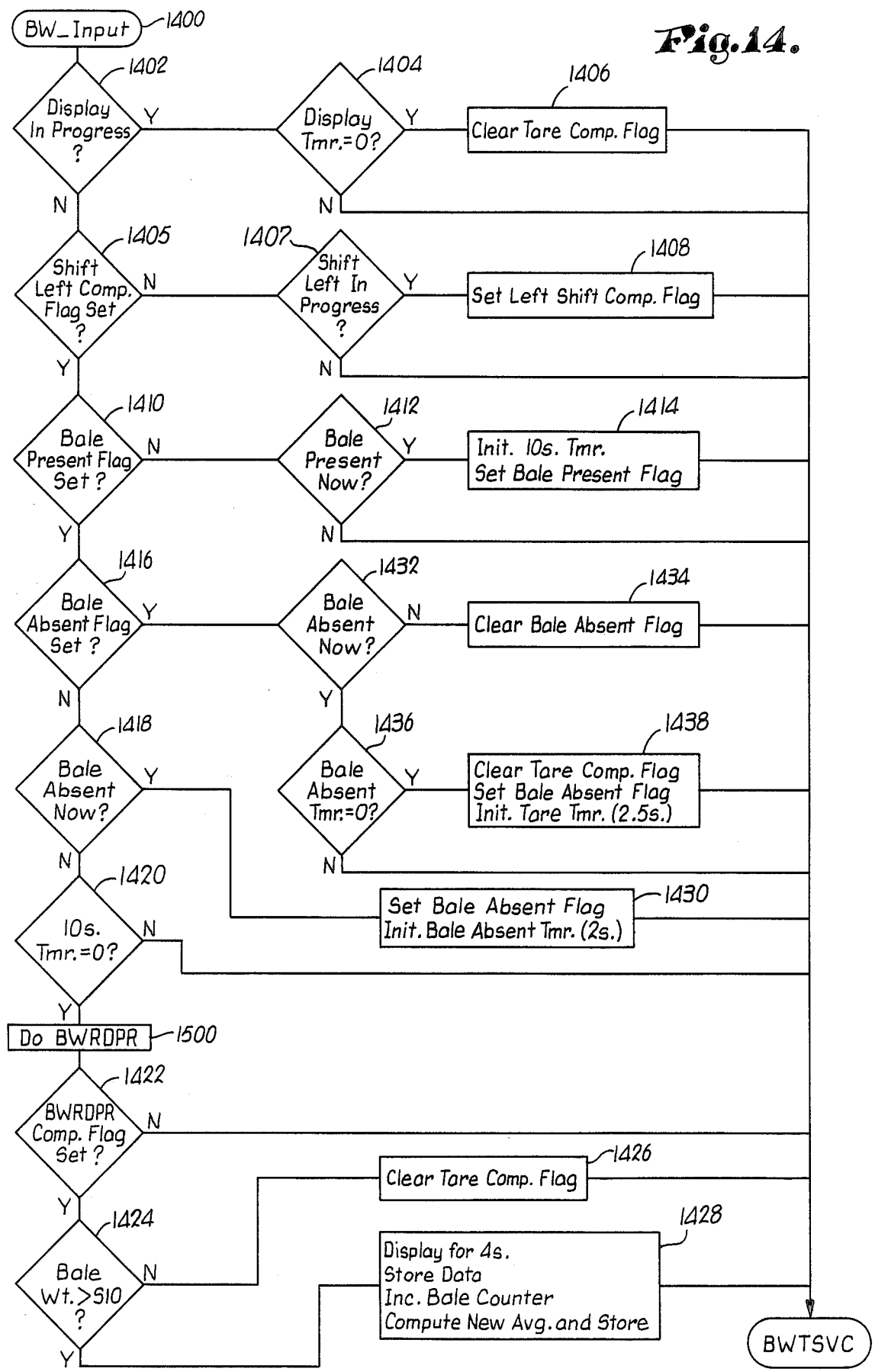
FIG. 14 is a flowchart of the computer program bale weight input module.

After the scale tearing process of submodule 1300 is complete or abandoned, the tare complete flag is set (steps 1320, 1332 or 1342) and module 1200 moves from step 1202 to step 1400 to initiate the bale weight input submodule 1400 as illustrated in FIG. 14.

Submodule 1400 includes provisions for verifying the presence of a bale on scale 702 and incorporates a further submodule—bale weight read process (BWRDPR)—in which the bale weight data is actually read from shift register 816 (FIG. 8).

The program enters submodule 1400 at step 1402 which asks whether a display is in progress on the display panel in order to prevent any new data entry until the old display is complete.

If a display is in progress, the program moves to step 1404 which asks whether the display timer has decremented its count to zero. If not, the program exits and continues to loop through steps 1402 and 1404 until the timer has decremented to zero. When this occurs, the program moves to step 1406 to clear the tare complete flag in order to move bale weight service module 1200 into the taring submodule 1300.

Assuming a display is not in progress when the program enters step 1402, the program then moves to step 1404 and asks whether the shift left complete flag is set. This flag was set in step 1320 of the taring submodule 1300 and is set each time the program detects that the positioner of the accumulator has operated to shift a bale leftwardly on to the scale. This information indicates to the program that a new bale may be present on scale 702. If the shift left complete flag is not set, the program moves on to step 1406 which asks whether a shift left is in progress. If no, the program exits and continues to loop through steps 1402, 1404, and 1406 and exit until a shift left is detected. In other words, this provision ensures that bale weight input submodule 1400 does not progress any further until a new bale may be present on the scale. When a shift left has occured as determined in step 1406, the program moves on to step 1408 to set the left shift complete flag.

During the next pass through submodule 1400, the program then moves on from step 1404 with indication that the shift left complete flag is set to step 1410 which asks whether the bale present flag is set. If not, the program moves to step 1412 and asks whether bale is present now. It may occur that positioner shifted leftwardly with no bale present in which case the program exits step 1412 and continues to loop through until bale presence is detected on the scale. When bale presence is detected, the program moves to step 1414 and initiates a timer for a count of 10 seconds and sets the bale present flag. The 10 second timer prevents reading bale weight data for 10 seconds in order to verify the actual presence of a bale on the scale and to give the scale time to stabilize.

During the next pass through submodule 1400, the program moves from step 1410 to step 1416 and asks whether the bale absent flag is set. Normally this flag should not be set and the program moves to step 1418 and asks whether a bale is absent now. Normally a bale should not be absent and the program moves to step 1420 which asks whether the 10 second timer has decremented to zero. If not, the program exits and with each pass through submodule 1400 continues to exit after step 1420 until the 10 second timer has decremented to zero. When this has occured, the program moves on to bale weight read process submodule 1500 in order to read in scale weight data which will be discussed in more detail hereinbelow.

After the program passes through submodule 1500, it moves on to step 1422 which asks whether BWRDPR complete flag is set. If no, the program exits and continues to exit at step 1422 until the bale weight read process is complete as indicated by the BWRDPR complete flag being set. When this occurs, the program moves on to step 1424 and asks whether the new bale weight exceeds 510 pounds. This step is inserted to add additional assurance of a genuine bale being present on scale 702. In the preferred embodiment, a normal bale weighs considerably more than 510 pounds and the presence of weight less than 510 pounds indicates a spurious event or abnormality such as someone standing on the scale or a partial, broken bale present on the scale, for example. To ensure accuracy of the bale weight data, and to provide accurate belt count and average bale weight, it is advantageous not to store this abnormal data. Thus, if the bale weight is not greater than 510 pounds, the program moves to step 1426 to clear the tare complete flag so that bale weight service module 1200 moves through the bale weight tare submodule 1300.

If the new bale data indicates that the bale weighs over 510 pounds, the program moves to step 1428 which causes a display of the new bale weight for 4 seconds, stores the bale weight data in memory, increments the bale counter, and computes a new average bale weight and stores that data in memory as well.

Upon the instruction to display the bale weight for 4 seconds, microprocessor 1002 provides serial latch output from terminal P14 via line 1075 to terminal 1058, and output from terminal TXD via line 1077, inverter 1078, and line 1079 to serial clock output terminal 1060, and serial data from terminal RXD via line 1029 to serial data output terminal 1062. The outputs from terminals 1058, 1060, and 1062 are received by display circuit 1102 which causes LCD display 1104 to display the weight of the bale.

The new bale weight data is added to the running total stored in memory, the total bale weight count, also stored in memory, is incremented by 1, and the program computes a new average bale weight according to conventional programming techniques and stores this new average in memory.

When desired, the bale weight average can be displayed by depressing switch 1030 which, through conventional programming techniques, causes microprocessor 1002 to output data to terminals 1058, 1060, and 1062 in order to display the average bale weight on LCD display 1104. Similarly, by depressing bale count switch 1042, the accumulated bale count is also displayed.

Bale weight input submodule 1400 incorporates additional steps for verifying the presence of a bale on scale 702 and for ensuring valid bale weight data. If, in step 1418, a bale is indicated as being absent, the program moves to step 1430 to set the bale absent flag and to initiate the bale absent timer at a count for 2 seconds. It may occur, for example, that the bale on scale 702 bounces or some other event occurs which momentarily indicates the absence of a bale from scale 702. It is desired to determine whether such an event is spurious or whether a bale is actually absent. The program does this by checking for bale absence for 2 seconds. If bale absence is indicated for 2 seconds, then it assumed that a bale truly is absent and the program should move into taring submodule 1300.

During the next pass through submodule 1400, the program sees the bale absent flag set in step 1416 and moves to step 1432 which asks whether the bale is absent now. If not, this is an indication that the absence of a bale as indicated in step 1418 was a spurious event in which case the program moves to step 1434 to clear the bale absent flag. If, however, the bale is still absent as determined in step 1432, the program moves instead to step 1436 which asks whether the bale absent timer has decremented to zero. If not, the program exits and continues to pass through step 1436 and exit until the bale absent timer is decremented to zero or until bale presence is detected.

If the bale absent timer decrements to zero, the program moves from step 1436 to step 1438 to clear the tare complete flag, to set the bale absent flag, and to initiate the tare delay timer at 2.5 seconds rather than 3.5 seconds as called for in step 1314. The tare delay timer is initiated at this value because submodule 1400 has already verified the absence a bale for 2 seconds by virtue of bale absent timer. Once step 1438 clears the tare complete flag, the bale weight input submodule 1400 is abandoned in favor of tare submodule 1300.

Figure 15:
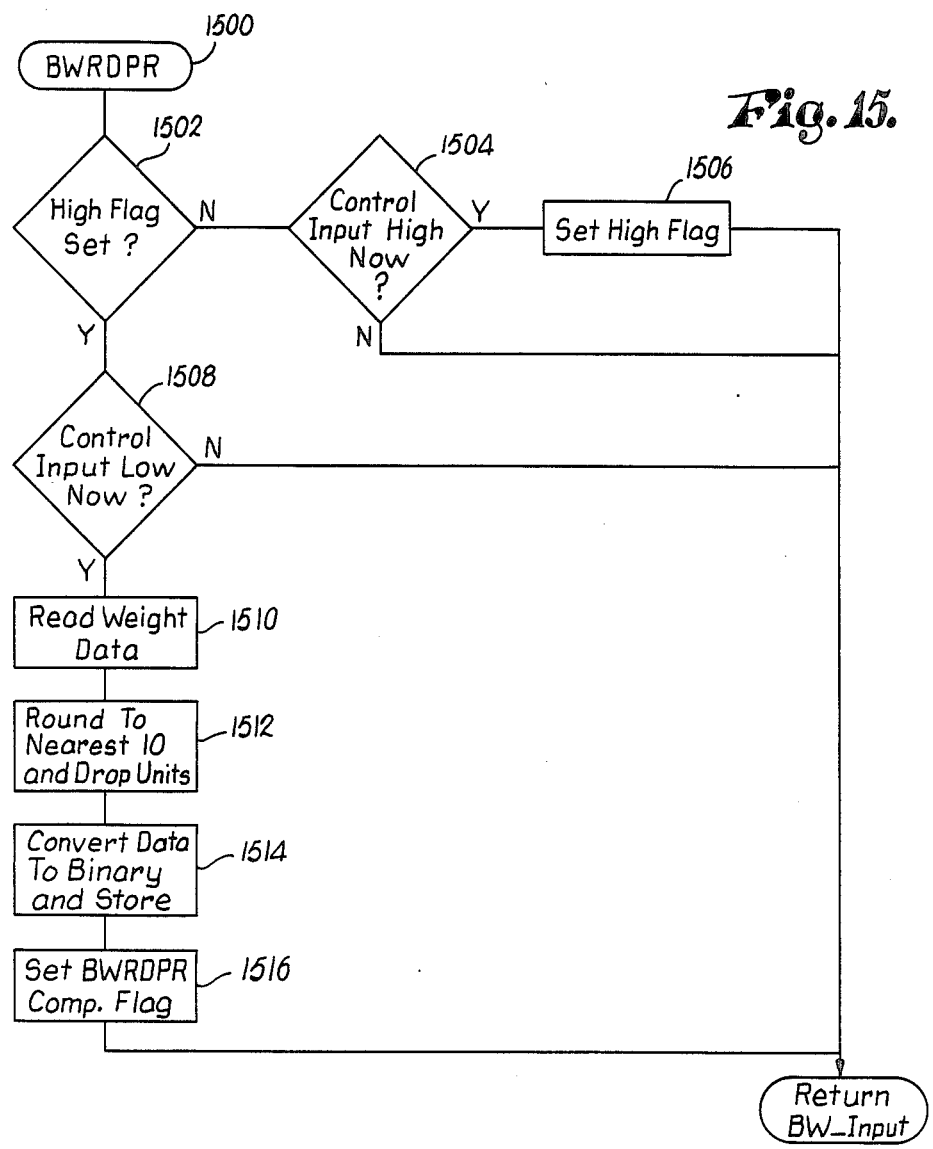
FIG. 15 is a flowchart of the computer program bale weight read process submodule.

Bale weight read process (BWPDR) 1500 is illustrated in FIG. 15 and first asks in step 1502 whether the high flag is set. This refers to the control signal on terminal 852 which is received at terminal P35 of microprocessor 1002. As described above in connection with circuit 800, whenever scale circuit 710 is delivering data, the control signal goes high and remains high while the data is being transmitted, and then goes low as an indication that scale data transmission is complete. Submodule 1500 is configured to wait until the control signal has gone high and then low before reading data from shift register 816. Thus, submodule 1500 in step 1502 first asks whether the high flag is set. If not, the program moves on to step 1504 which asks whether the control input in high now. If not, the program exits and continues to exit after step 1504 until the control signal goes high at which point the program moves to step 1506 to set the high flag for step 1502.

During the next pass through, the program sees the high flag set in step 1502 and moves to step 1508 which asks whether the control input is low now. As described above, the control input remains high for approximately 2.2 milliseconds while scale circuit 710 is transmitting data and thus the program exits from step 1508 until the control signal goes low.

When this occurs, the program moves on to step 1510 and reads the bale weight data as stored in shift register 816. In step 1510, terminal P15 of microprocessor 1002 goes high via line 1073 to terminal 1056 in order to send the bale weight enable signal to circuit 800. Additionally, microprocessor 1002 sends serial clock data from terminal TXD via line 1077, inverter 1078, line 1079, and terminal 1060 which is received by circuit 800 and which clocks through the last 32 bits stored in shift register 816. The 32 bits of data represent the four digits in binary encoded decimal form of the weight of the bale present on the scale. Microprocessor 1002 receives the data from shift register 816 via serial data bus or line 1029.

The program then moves on to step 1512 which rounds the bale weight data to the nearest 10 pounds and drops the units digit. For example, a bale weight of 1525 is rounded to 1530 and the unit's digit is dropped which, because of the rounding, is always zero. Thus, in the LCD display, the unit's digit is always zero because of this rounding. The rounding is preferred because the unit's digit provides little practical and useful information to the operator of the baler and also to conserve computer memory. Those skilled in the art will recognize that this is a matter of design choice and if desired, sufficient memory can be used or provided in order to keep the unit's digit without rounding.

The program then moves on to step 1514 which converts the bale weight data, to binary and stores that data in memory.

The program then moves on to step 1516 to set the BWRDPR complete flag and then returns to bale weight input submodule 1400 as described above.

Having thus described the preferred embodiment of the present invention, what is claimed as new and desired to be secured by Letters Patent is:

1. A method of automatically weighing crop bales produced by a mobile crop baler, said method comprising the steps of:
   discharging a bale from the baler onto a bale-receiving structure coupled with the baler, said structure including an electronic, bale-weighing scale;
   positioning said bale on said scale;
   producing a bale-weight indicating, scale signal with said scale when said bale is present thereon;
   transmitting said scale signal from said scale to a computer;
   processing said scale signal in said computer;
   producing a bale-weight indicating display signal with said computer in response to said scale signal;
   transmitting said display signal from said computer to a display panel; and
   displaying a visual representation of the weight of said bale on said display panel in response to said display signal.

2. The method as set forth in claim 1, further comprising the steps of:
   discharging said bale from said structure after producing said scale signal; and
   sequentially repeating said steps.

3. The method as set forth in claim 1, further comprising the steps of:
   determining whether a bale is present on said scale;
   producing a tare signal with said computer during an interval of time when no bale is present on said scale; and
   transmitting said tare signal from said computer to said scale for taring said scale during said interval.

4. The method as set forth in claim 1, said processing step including the steps of:
   counting the total number of bales that have been weighed;
   determining the total weight of the bales that have been weighed;
   calculating the average weight of the bales that have been weighed;
   producing with said computer an average-weight signal indicative of said average weight;
   transmitting said average-weight signal from said computer to said display panel; and displaying a visual representation of said average weight on said display panel in response to said average-weight signal.

5. The method as set forth in claim 1, said processing step including the steps of:
counting the number of bales that have been weighed;
producing with said computer a bale count signal indicative of the total number of bales that have been weighed;
transmitting said bale count signal from said computer to said display panel; and
displaying a visual representation of said total bale count on said display panel in response to said bale count signal.

6. In combination with a mobile crop baler which produces crop bales as it advances across a field of crops, a system for weighing bales produced by said baler comprising:
a bale-receiving structure coupled with said baler for receiving bales discharged from said baler, said structure including
an electronic scale for receiving a bale thereon and for producing and transmitting a scale signal indicative of the weight of said bale, and
means for positioning said bale on said scale;
a computer operably coupled with said scale for receiving and processing said scale signal and for producing and transmitting a display signal indicative of said bale weight; and
a display panel operably coupled with said computer for receiving said display signal and for producing a visual representation indicative of said bale weight in response to reception of said display signal.

7. The system as set forth in claim 6, further including means operably coupled with said computer for indicating thereto the absence of a bale from said scale,
said computer including means for producing and transmitting a tare signal to said scale during an interval of time during which a bale is absent from said scale.

8. The system as set forth in claim 6, said computer including means for:
determining the average weight of bales weighed by said system and for producing and transmitting an average-weight signal indicative of said average weight to said display panel,
said display panel including means for receiving said average weight signal and for producing a visual representation indicative of said average weight in response to reception of said average-weight signal.

9. The system as set forth in claim 6, said computer including means for determining the total number of bales weighed by said system and for producing and transmitting a total bale count signal indicative of said total bale count to said display panel, said display panel including means for receiving said total bale count signal and for producing a visual representation of said total bale count in response to reception of said total bale count signal.

10. A method of automatically weighing crop bales produced by a mobile crop baler, said method comprising the steps of:
receiving a bale produced by said baler on to an electronic scale;
producing a bale-weight indicative, scale signal with said scale when said bale is present thereon;
transmitting said scale signal to a computer;
processing said scale signal with said computer; verifying the presence of said bale on said scale by determining whether said bale has been present on said scale for a predetermined period of time;
determining whether the apparent weight of said bale as indicated by said scale signal exceeds a predetermined weight minimum;
producing a bale-weight indicative, display signal with said computer in response to said scale signal;
transmitting said display signal to a display panel; and
displaying on said display panel a visual representation indicative of the weight of said bale in response to said dispaly signal.

* * * * *